(12) United States Patent
Edgarian et al.

(10) Patent No.: US 10,207,654 B2
(45) Date of Patent: Feb. 19, 2019

(54) RETENTION SYSTEM, IN PARTICULAR FOR A CAMERA IN AN INSIDE COMPARTMENT OF A VEHICLE

(71) Applicant: Aptiv Technologies Limited, St. Michael (BB)

(72) Inventors: Robik Edgarian, Wuppertal (DE); Ravindra Kulkarni, Bangalore (IN)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/624,849

(22) Filed: Jun. 16, 2017

(65) Prior Publication Data

US 2017/0361780 A1  Dec. 21, 2017

(30) Foreign Application Priority Data

Jun. 17, 2016 (EP) ..................... 16175046

(51) Int. Cl.
| | |
|---|---|
| B60R 11/04 | (2006.01) |
| F16B 2/24 | (2006.01) |
| F16B 5/06 | (2006.01) |
| H04N 5/225 | (2006.01) |
| B60R 11/00 | (2006.01) |
| F16B 1/00 | (2006.01) |

(52) U.S. Cl.
CPC .............. B60R 11/04 (2013.01); F16B 2/243 (2013.01); F16B 2/245 (2013.01); F16B 5/0685 (2013.01); H04N 5/2252 (2013.01); H04N 5/2253 (2013.01); B60R 2011/0026 (2013.01); F16B 2001/0092 (2013.01)

(58) Field of Classification Search
None
See application file for complete search history.

(56) References Cited

U.S. PATENT DOCUMENTS

| | | | | |
|---|---|---|---|---|
| 3,390,856 | A | * | 7/1968 | Van Buren, Jr. .......... E04B 9/16 248/228.3 |
| 3,984,191 | A | * | 10/1976 | Doty ....................... F16B 2/245 403/69 |
| 6,124,886 | A | * | 9/2000 | DeLine ................ B60Q 1/2665 348/148 |
| 2013/0015288 | A1 | * | 1/2013 | Hernandez .............. F16B 2/245 244/3.1 |
| 2016/0229355 | A1 | * | 8/2016 | Hayashi .................. B60R 11/04 |
| 2017/0361780 | A1 | * | 12/2017 | Edgarian ................ B60R 11/04 |

FOREIGN PATENT DOCUMENTS

| | | |
|---|---|---|
| DE | 10 2013 005801 A1 | 10/2014 |
| WO | 2013/009368 A1 | 1/2013 |

* cited by examiner

*Primary Examiner* — William B Perkey
(74) *Attorney, Agent, or Firm* — Lawrence D. Hazette

(57) ABSTRACT

A retention system on a mounting structure for a generally cylindrical component extending in a transversal axis. The retention system includes a generally U-shaped spring clip comprising a base and a pair of resilient retainer arms extending from the base along a longitudinal axis and defining an inlet passage; and a member holding said U-shaped spring clip; the retainer arms are adapted to engage with an upper side of the component in front of the inlet passage. The member includes one or multiple rigid retention walls extending inside the spring clip and which are adapted to engage with a lower side of the component at distance of the base, in working position.

15 Claims, 4 Drawing Sheets

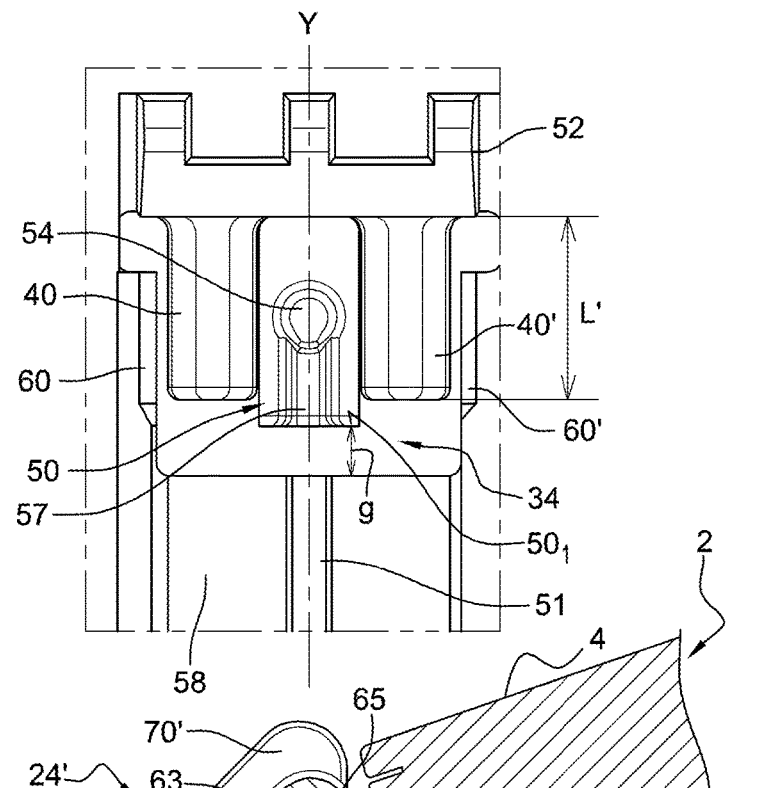
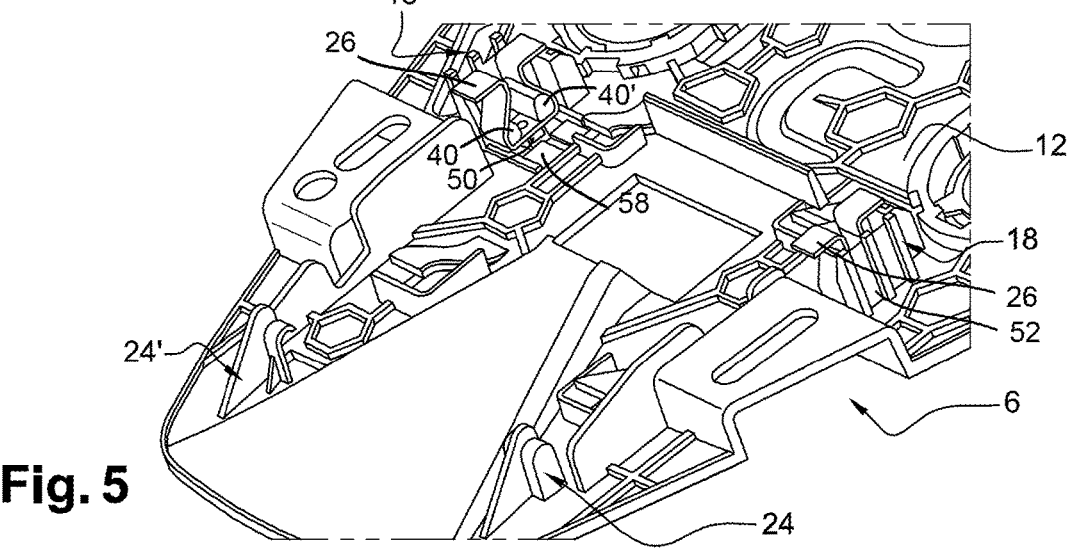

RETENTION SYSTEM, IN PARTICULAR FOR A CAMERA IN AN INSIDE COMPARTMENT OF A VEHICLE

CROSS-REFERENCE TO RELATED APPLICATION

This application claims the benefit under 35 U.S.C. § 119(a) of European Patent Application EP 16175046.8, filed 17 Jun. 2016, the entire disclosure of which is hereby incorporated herein by reference.

TECHNICAL FIELD OF INVENTION

The present invention generally relates to the field of retention systems. The invention relates in particular to a retention system, also known as retention bracket, for a fixing component of an article, e.g. a camera.

BACKGROUND OF INVENTION

Automobile vehicles which provide driving assistance are generally constructed with vision systems. For advanced driving assistance, vision systems can be installed in the passenger compartment. For example, a camera can be arranged behind the windscreen in order to make the road visible. Typically, the camera is mounted on a support or bracket, which is then fixed to the windscreen. The driving assistance requires a robust construction of the camera mounting system to be secure and ensure safety of the passengers, especially in case of crash. However, the camera mounting system shall not be a permanent fixation in order to allow the removal of the camera, for example for maintenance. In the past, clipping systems (namely snap fit systems) have been used, but they wear out rapidly, especially after multiple use. Damaging of such mounting system may also require the exchange of the windscreen, which is expensive.

WO 2013/009368 A1 discloses a retention system, on a mounting structure, for a generally cylindrical component, the retention system comprising: a generally U-shaped metal spring clip comprising a base and a pair of symmetric resilient retainer arms extending from the base and defining an inlet passage; and a member holding the U-shaped spring clip. The retainer arms have a substantially arcuate shape (hourglass-shaped profile), so that each retainer arm contacts the component over a substantial peripheral region, which allows securing the component between the retainer arms. This system may have some interest since the spring clip is metallic and may prove more robust against high temperature and humidity over time. However, the retention force of the bracket is linked with the design of both the spring clip and the junction of the spring clip with its holding member, which is complex. Furthermore, to avoid vibration, a precise match of shapes is required between the arcuate retainer arms and the cylindrical component.

SUMMARY OF THE INVENTION

The object of the present invention is to provide a solution, which overcomes the shortcomings of prior art retention systems. In particular, the object of the present invention is to provide a retention system of reliable and economic design.

The present invention relates to a retention system, on a mounting structure, for a generally cylindrical component, which comprises: a generally U-shaped spring clip comprising a base and a pair of resilient retainer arms extending from the base along a main axis and defining an inlet passage; and a member holding said U-shaped spring clip.

It shall be appreciated that the retainer arms are adapted to engage with a first side of the component facing the inlet passage; and that the member comprises one or multiple rigid retention wall(s) extending inside the spring clip and which are adapted to engage with an opposite, second side of the component at a distance from the spring clip base, in working position.

A merit of the present invention is to provide a retention system of simple and economic design. It requires a holding member which can generally be manufactured by injection molding with the mounting structure, and U-shaped spring clip, typically made from spring steel. Upon insertion of the component into the clip, via the inlet passage, the component is retained resiliently via the retainer arms, which engage one side of the generally cylindrical component, whereas the component is in abutment, with its opposite side, against the one or more, e.g. two, retainer walls. In this working position, the component is thus contacted at its periphery by the retainer arms that push the component against the rigid support wall(s) for stable mounting, which is favorable to avoid vibrations. The term "rigid" herein means that the retention walls have a greater rigidity than the resilient retainer arms.

The spring clip will allow removal of the fixing component, as may be required depending on the application. The use of a metal spring clip is of advantage: it allows easily controlling the spring force and will prove more robust against high temperature and humidity over time than plastic.

Preferably, each of the resilient retainer arms engages the first side of the component on an upper peripheral portion which is lower than 45°, preferably lower than 20°, more preferably which is between 1° and 5°. A narrow or even punctual contact zone facilitates the design shape of the retainer arms and is more favorable to avoid vibrations.

According to a preferred embodiment, the rigid retention wall(s) engage the lower side of the component at an average distance of the base beyond 25% of the height of the spring, preferably between 30% and 40% of said length. This is interesting to facilitate the design of the spring clip and the corresponding retention force of the retainer arms to withstand specific extraction force requirements.

In embodiments, the spring clip holding member comprises two lateral sub-members, preferably disjoined, each of the lateral sub members comprising at least one retention wall engaging a respective lateral peripheral portion of the component (on the second side). Such design provides a stable retention of the component at four contact zones.

Advantageously, each lateral sub-member comprises one support wall, which is configured to be in contact with the end portion of the inner face of the base in rest position (i.e. the mounting position of the spring clip, when no fixing component is in the spring clip).

In embodiments, each of the retainer arms is generally inclined and connected to the base via an elbow, and each of said lateral sub-members comprises a side face which presents a clearance with corresponding elbow in working position.

In a preferred embodiment, the retention system further comprises a reception sub-platform spaced from the support walls, the system being configured to receive the spring clip base between the support walls and the reception sub-platform in rest position (i.e. the mounting position of the spring clip on the holding member, absent the cylindrical component).

Conveniently, the system comprises a rear support, the holding member and the reception sub-platform protruding from said rear support.

Advantageously, the holding member and the sub-platform are integral with the rear support.

Preferably, the reception sub-platform is a second reception sub-platform which receives a central portion of the outer face of the spring clip base, the retention system comprising a first reception sub-platform at distance from said second reception sub-platform, the system being configured to receive the outer face of the base on the first reception sub-platform, and allow sliding the base on the second reception sub-platform, for mounting the spring clip.

The reception sub-platform advantageously extends beyond the holding member. For example, the length of the reception sub-platform may have a length which is more at least 20% more that of the holding member. This design facilitates the sliding movement of the base while assembling the spring clip to the holding member.

The reception platform may further comprise inclined lateral support walls adapted to receive the external face of the elbows while pivoting around the transversal axis.

In order to lock the spring clip in its rest position, the second reception sub-platform preferably comprises a cavity configured to receive a corresponding locking protrusion provided in the spring clip base. This locking protrusion may take various forms: it may be punched in the base to form a dome or a circular raised edge; it may be formed as a snap tongue cut, in the base. These are only exemplary possibilities of locking protrusions.

In embodiments, the spring clip is a metal foil, preferably made out of carbon steel. The metal foil may have a thickness between 0.3 mm and 1.5 mm, preferably between 0.5 mm and 0.8 mm.

To facilitate the removal of the fixing component from the retention system, the free ends of the retainer arms are shaped as flanges extending transversally to the inlet passage. Pressing on the flanges towards the clip base will broaden the inlet passage and hence facilitate the extraction of the component.

The sizing of the retention system may vary depending on the application. For example, the generally cylindrical component may have a diameter between 3 mm and 15 mm, in particular between 5 mm and 10 mm. In such case, the spring clip may have a height between 6 mm and 30 mm, preferably between 10 mm and 20 mm.

It may be noted that the generally cylindrical component preferably has a circular cross-section, however slightly oval, square/rectangular or polygonal shapes, and mixes of shapes, should not be excluded.

The spring clip may be designed to withstand an extraction force of the component through the inlet passage, which is between 70 N and 150 N.

Preferably, the spring clip is designed so that the extraction force is greater than the insertion force through the inlet passage, which may then lie between 50 N and 100 N.

According to another aspect, the invention also relates to a mounting structure (or mounting bracket) comprising at least one retention system as described herein.

While the invention has been designed for a camera assembly, the present resilient system and mounting structure can be used in a variety of applications, in particular where an article is provided with a generally cylindrical fixing component protruding from its housing.

According to a further aspect, the invention concerns a camera assembly, preferably for installation behind the windscreen in a passenger compartment of an automobile vehicle, comprising: a camera with two generally cylindrical components extending along a transversal axis in opposite directions at one end of said camera; a mounting structure for the camera comprising: a reception platform with a first side (14) adapted to be fixed to the windscreen, and an opposite side adapted for receiving the camera; two retention systems (18; 18') for holding the corresponding generally cylindrical components (8; 8'); wherein said at least one generally cylindrical component is fixed by a retention system as described herein, arranged on said platform.

Advantageously, each of the two generally cylindrical components comprises a cavity facing the inlet passage, in mounted position of the camera on the mounting structure. This can facilitate the manufacturing of the component on the camera.

In an embodiment, the camera further comprises two legs at an opposite end of the camera housing, the mounting structure further comprising two leg holders adapted for holding a respective leg. Each leg holder preferably comprises a rigid hook, which is adapted to retain a corresponding leg; and the rigid hook comprises a fool-proof mounting rib running on the external side of the rigid hook and extending by a noticeable amount over the top portion of hook.

The present camera assembly benefits from a reliable design allowing at least 10 mounting and dismounting of the camera from the mounting structure, and allowing installation above the central mirror with limited space. The use of spring clips, in particular metal spring clips, in the retention system provide enhanced reliability, namely in terms of resistance against temperature and humidity, as compared to plastic snap fit systems. Furthermore, the proposed camera assembly is designed to withstand severe crash tests.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example, with reference to the accompanying drawings, in which:

FIG. 3 is a top view of the retention system of the camera assembly of FIGS. 1 and 2, without the spring clip;

FIG. 4 is a section view IV-IV of the camera assembly of FIG. 1 at the level of one engagement system;

FIG. 5 is a perspective view of the mounting structure of FIG. 1, without the camera;

DETAILED DESCRIPTION

Figure 1:
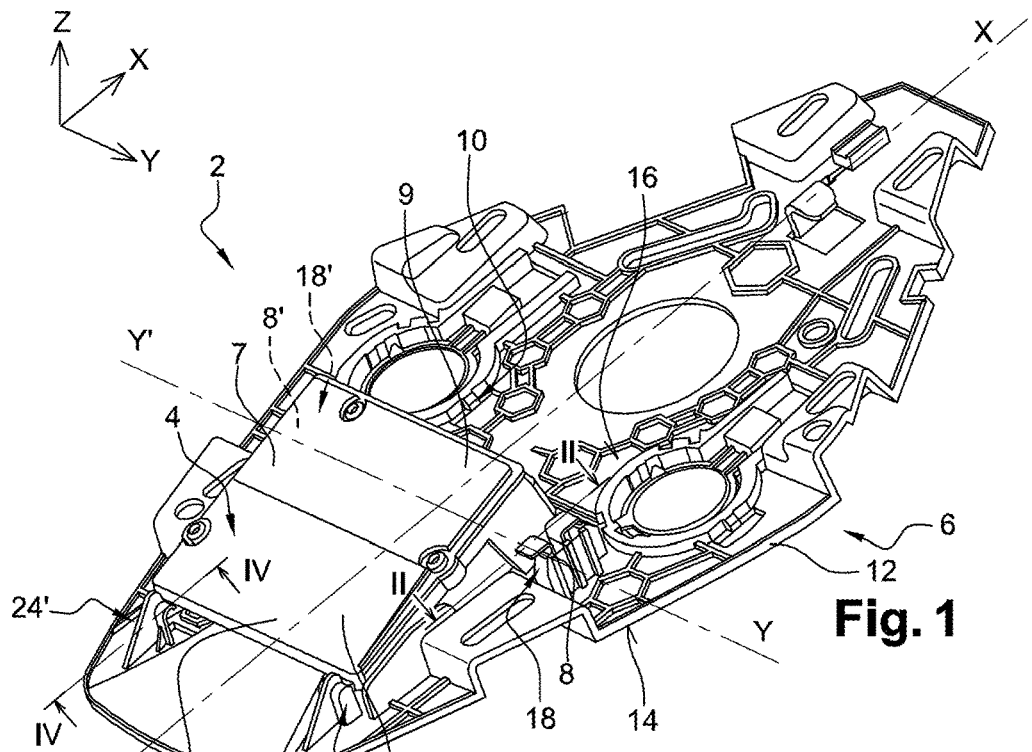
FIG. 1 is a perspective view of a camera assembled to a mounting structure featuring a retention system according to one embodiment of the present invention.

FIG. 1 is a perspective view of a camera assembly 2 featuring the present retention system. The camera assembly 2 comprises a camera 4 and a mounting structure 6. The camera assembly 2 as presented here is fixed behind the windscreen in a passenger compartment of an automotive vehicle (not represented). The camera 4 comprises a housing 7 with, at one end 9 of the housing, two generally cylindrical fixing components 8 and 8', which extend transversally in opposite directions Y and Y', and which are in this variant perpendicular to the longitudinal axis X of the mounting structure 6. The mounting structure 6 comprises a reception platform 12 with a lower, first side 14 adapted to be fixed on the windscreen. The mounting structure 6 is adapted for receiving the camera 4 lying on the upper, second side 16 of the reception platform. Upon assembly, the camera 4 has its front side facing the platform 12; the opposite rear side 7b is thus the visible side in FIG. 1. The mounting structure 6 comprises two retention systems 18 and 18' according to the invention, each of them being adapted for holding one of the generally cylindrical components 8 and 8' protruding from the camera housing. The sectional view II-II of FIG. 2 represents the retention system 18 of the mounting structure, which removably secures the cylindrical component 8 and which will be described in detail herein below.

The longitudinal, transversal and vertical axes (X, Y, Z) are presented in the figures mainly for ease of explanation. The same applies to the terms "upper" and "lower", which refer to the orientation in the figures. It may be noticed that in practice, the reception platform 12 could have various orientations, depending on the application. In the case of a vehicle vision system, the camera assembly presented here will be fixed to the windscreen inside the passenger compartment, with the first side 14 against the windscreen (i.e. up-side down as compared to the drawing orientation).

The camera 4 further comprises two engagement means taking the form of legs, which are located at an opposite end 22 of the camera housing (in the direction of axis X) and cooperate with two leg holders 24 and 24', as will be described below in relation to FIG. 4.

Figure 2:
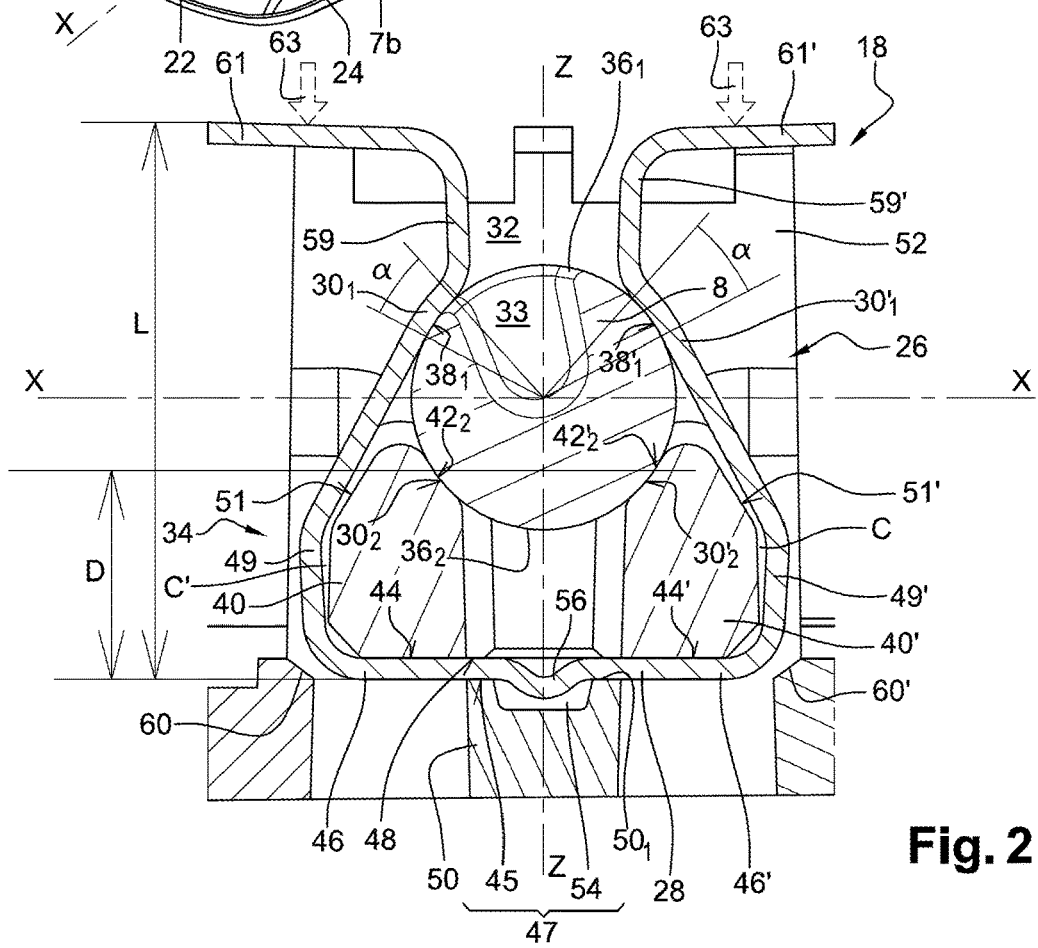
FIG. 2 is a section view II-II of the camera assembly of FIG. 1 at the level of one retention system, in working position of the retention system.

Turning now to FIG. 2, the retention system 18 comprises a generally U-shaped spring clip 26, which comprises a base 28 and a pair of resilient retainer arms 30₁ and 30₁', which define an inlet passage 32. As can be seen in FIG. 2, the retainer arms 30₁ and 30₁' extend from the base 28 and define the general extension axis of the spring clip 26, which is referred to as main axis and here corresponds to the direction of vertical axis Z. The retention system also comprises a holding member 34, which is designed for holding the U-shaped spring clip 26. The retainer arms 30₁ and 30₁' are adapted to engage with a first side 36₁ (here upper side) of the generally cylindrical component 8 that faces the inlet passage 32. Holding member 34 comprises one rigid retention wall or multiple rigid retention walls— here two walls 30₂ and 30₂', which extend inside the spring clip 26 and are adapted to engage with the opposite second side 36₂ (here lower side) of the component at distance from the clip base 28. The configuration shown in FIG. 2 corresponds to the working position of the retention system: it is the stable position in which the fixing component is securely retained by the spring clip. In working position, the pin-like fixing component 8 is locked in place at its periphery by the resilient arms pressing the fixing component 8 against the retention walls 30₂, 30₂'.

The resilient retainer arms 30₁ and 30₁' engage the upper side 36₁ (facing the inlet passage) and are each in contact with upper peripheral portions 38₁ and 38₁' of the component 8. The upper peripheral portions 38₁ and 38₁' preferably have a peripheral extension that is included in an angular sector a lower than 45°, preferably lower than 20°. In particular, the retainer arms 30₁ and 30₁' engage the upper peripheral portions 38₁ and 38₁' of the component's upper side 36₁ over an angular sector between 1° and 5°, a punctual contact being sufficient.

The rigid retention walls 30₂ and 30₂' may be positioned to engage the lower side 36₂ of the component at an average distance D from the base, which is greater than 25% of the height L of the spring. As used herein, "height" means the height of the spring along its main axis of extension (i.e. along vertical axis Z in FIG. 2). For the sake of exemplification, the generally cylindrical component 8 may have a diameter between 3 mm and 15 mm, in particular between 5 mm and 10 mm. It should also be noted that whereas the shown cylindrical component 8 has a circular cross-section, other shapes are possible, for example square, rectangular, polygonal, oval, etc., and possibly mix of shapes.

In the present embodiment, the camera housing 7 is made from aluminum alloy and the components 8, 8' are integrally manufactured with the housing. The component 8, 8' is thus made from a rigid material able to withstand the mechanical efforts during insertion and extraction. To save for material and minimize deformation, the component 8, 8' may be provided with a small longitudinal groove indicated 33. The spring clip 26 may have a height H between 6 mm and 30 mm, in particular between 10 mm and 20 mm.

In the preferred embodiment presented here, the holding member 34 comprises two lateral sub-members 40 and 40', each of them comprising one retention wall 30₂, 30₂' engaging a respective lateral lower peripheral portion 42₂, 42₂' of the component. The lateral sub-members 40, 40' are here disjoined, but in other embodiments they may be joined in the longitudinal X-direction. The sub-member 40, on the left of the figure, includes the retention wall 30₂, against which the lateral lower peripheral portion 42₂ of fixing component 8 is in abutment. Sub-member 40', on the right on the figure, includes the retention wall 30₂', against which the lateral lower peripheral portion 42₂' of fixing component 8 is in abutment.

Each lateral sub-member 40 and 40' further comprises a respective support wall 44 and 44', which is configured to come into abutment with a corresponding end portion 46 and 46' of the upper face 48 of the clip base 28 in working position of FIG. 2. As can be further seen, each retainer arm 30₁, 30₁' is generally inwardly inclined and connects to the base via an elbow 49 and 49'. Each of the lateral sub-members 40 and 40' comprises a side face 51 and 51' with some clearance C, C' with respect to the corresponding elbow 49 and 49' and arm 30₁, 30₁', in working position. By way of this clearance, it is ensured that the movement of the resilient arms 30₁, 30₁' is not hampered by the side faces 51 and 51', so that the full elastic force can act on the fixing component 8. This functional clearance C will also permit adsorbing dimensional variations, in particular due to manufacturing tolerances.

As will be seen in relation to FIGS. 2, 3, 6 and 7, the retention system 18 further comprises a first reception sub-platform 58 and a second reception sub-platform 50 that cooperate with the support walls 44 and 44' in the assembly of the spring clip. It may be observed that the clip base 28 is received between the support walls 44 and 44' and the second reception sub-platform 50. The spacing between the latter preferably defines a spacing, that corresponds to the thickness of the spring clip base 28 with some functional play, in particular for ease of mounting the spring clip. The second reception sub-platform 50 is positioned centrally below the two sub-members 40, 40'.

As can be seen, the second reception sub-platform 50 has an upper reception wall 501, which is in contact with the lower face 45 of the clip base 28. More specifically, the second reception sub-platform cooperates with a central portion 47 of the lower side 45 of the base.

A rear support 52 is provided on the reception platform 12, from which the holding member 34, together with the two lateral sub-members 40, 40', and the second reception sub-platform 50 protrude along the transversal axis Y, i.e. perpendicularly to the rear support 52. As can be understood from the drawings, in this embodiment the rear support 52 is formed as a wall extending in a plane parallel to the XZ plane.

In practice, the reception platform 12 may typically be manufactured by injection molding, so that the holding member 34 and the second reception sub-platform 50 may be integral with the rear support 52.

Reference sign 54 indicates a cavity in the second reception sub-platform 50, which is configured for receiving a corresponding locking protrusion 56 in the clip base 28. The locking protrusion 56 is here formed as a protruding annular edge in the base (e.g. by punching). For ease of assembly, a straight guide groove 57 is arranged in the upper reception wall of sub-platform 50, extending from the free front edge of sub-platform 50 to cavity 54.

Figure 6:
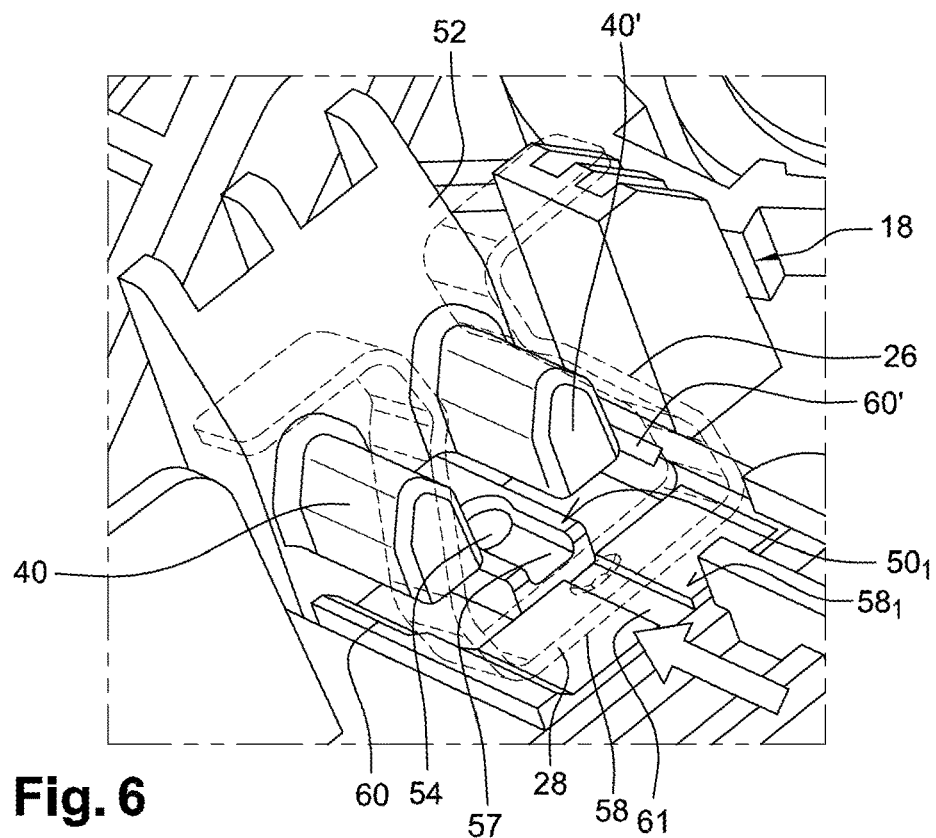
FIG. 6 is a perspective view illustrating the assembly of the spring clip on its holding structure.
Figure 7:
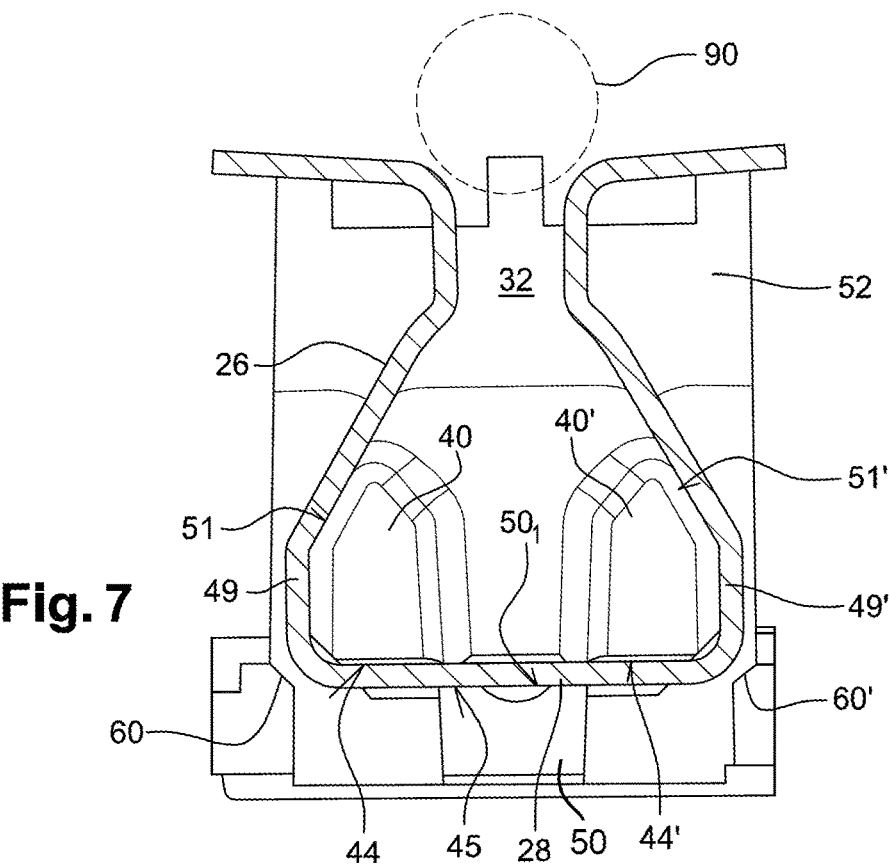
FIG. 7 is a front view of the spring clip assembled on its holding structure, in rest position.

The assembly of the spring clip 26 in the retention system 18 will now be explained with reference to FIGS. 3 and 6. FIG. 3 is a top view of the retention system 18 of the camera assembly of FIGS. 1 and 2 (without the spring clip), in which one can see the rear support 52 as well as the lateral sub-members 40 and 40', and the second sub-platform 50 protruding from the rear support 52. The first reception sub-platform 58, better seen in FIG. 6, is spaced from the second reception sub-platform 50 and arranged before the latter in direction Y. The upper side 581 of the first sub-platform 58 is preferably at about the same level as the reception wall 501 in the second sub-platform 50. A straight guide groove 61 is arranged in upper side 581, which is aligned with guide groove 57. The first and second sub-platforms 58, 50 are advantageously designed to assist during the assembly of the spring clip 26. The spring clip 26 (represented by phantom lines) is first positioned with the lower face of the spring base on the first reception sub-platform 58. The spring's locking protrusion 56 is located in guide groove 61 of the first sub-platform 58 and oriented to be substantially parallel to the support wall 52. From this position, the spring clip 26 is translated towards support wall 52 on the second reception sub-platform 50, by simply sliding on the reception sub-platforms 50, 58. The alignment is ensured by the cooperating guide grooves 57 and 61. The resulting configuration of the spring clip 26 held in place by the holding member is shown in FIG. 7: this is the rest position≠the fixing component 8 is not inside the spring clip 26.

For ease of mounting, the second reception sub-platform 50 extends beyond the length L' of the holding member in the transversal direction Y, namely beyond the lateral sub-members 40 and 40'. The length L' of the second reception sub-platforms may be greater than the length of the lateral sub-members 40 and 40' by 20% or more. Referring particularly to FIG. 3, a gap g is thus formed between the two sub-platforms 58 and 50, the first sub-platform hence being situated in front of (in Y direction) the front edge of the second sub-platform 50 and sub-members 40, 40'.

One will also notice that the first reception sub-platform 58 comprises inclined lateral support walls 60 and 60', which run parallel to the lower, external corner of each sub-member 40, 40', at predetermined distance therefrom. These lateral support walls 60 and 60' are adapted to contact the external face of the elbows 49 and 49', in order to limit the pivoting of the spring clip around the transversal axis, as it may occur during the extraction of the component out of the working position.

The spring clip 26 may typically be a metal foil made from carbon steel. The metal foil may have a thickness between 0.3 mm and 1.5 mm, in particular between 0.5 mm and 0.8 mm.

In the rest position, i.e. when the fixing component 8 is not present in the spring clip, the inlet passage 32 may have a passage width of 3 mm to 6 mm, as seen in the longitudinal axis X. During the introduction of the fixing component in the spring clip 26, the resilient arms 301 and 301' are spread apart up to the point where the width of the inlet passage 32 corresponds to the diameter of the fixing component 8, before the arms come closer again. In working position, the passage width is greater than in the rest position, preferably increased by less than 5 mm. In particular, the passage width is increased by less than 2 mm. The variety of shapes taken by the spring clip, between the rest position of FIG. 7 and the working position of FIG. 2, in order to allow insertion or extraction of the fixing component 8 may be referred to as bending positions or configurations.

The inlet passage 32 is defined by parallel sections 59 and 59' of the arms, which extend along vertical axis Z. The end portions of arms 301, 301' are formed as flanges 61 and 61' extending in the direction of the longitudinal axis X. As it will be understood, pressing one or both flanges 61, 61' downwards (direction of arrows 63) will increase the inlet passage's width and hence facilitate the extraction of the fixing component 8 from the spring clip 26.

As indicated above, the camera 4, in the assembly position, is held at one end of the camera housing 7 by its fixing components 8, 8' locked in the retention systems 18, 18'; and at the other end by a pair of legs 66, 66' extending from the camera housing 7. These legs with their leg holders 24' are better seen in FIG. 4. In the shown embodiment, the leg holder 24' comprises a rigid hook 62' that is configured to retain the leg 66' in the upper and lateral directions of the camera. Reference sign 64' designates a spring finger extending from the platform 12 and engaging with the camera housing (the housing front side 7a facing the platform 12). The spring finger 64' assists in the pivoting movement of the camera when the legs are positioned in the leg holders. The free end of the hook 62' forms a positioning cavity 63 open towards the reception platform 12 and spaced therefrom; the leg 66' has a bulge 65 engaging this cavity 63.

It may be appreciated that the leg holder 24' also comprises a fool proof mounting rib 70'. This rib 70' extends from the platform 12 and runs on the external side of hook 62' to increase its stiffness. Rib 70' also extends over the hook portion defining the positioning cavity 63. The rib 70' extends by a noticeable amount over the top portion of hook 62'. This design prevents a misassembly of the camera. Indeed, if the camera is engaged properly in one of the leg holders, but rests on the top of the other leg holder, the operator will inevitably notice the fact that the camera body appears to be tilted and hence not properly assembled. The second leg and leg holder as presented in FIG. 5 comprise the same characteristics as the ones presented here.

FIG. 5 is a perspective view of the mounting structure 6 without the camera, where the two retention systems 18 and 18' and the two leg holders 24 and 24' can be better seen.

Figure 9:
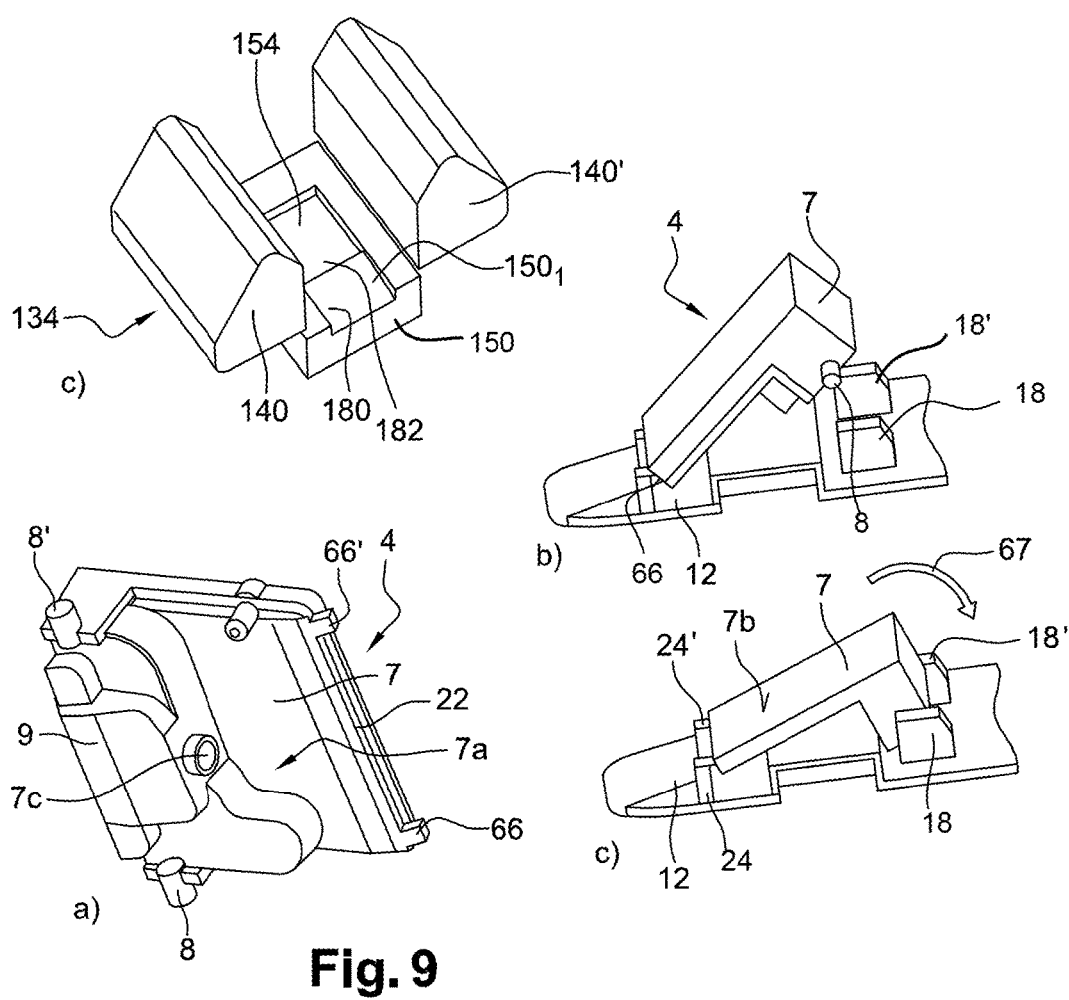
FIG. 9 comprise perspective views of a) the camera, from its front side; and b), c) illustrating the camera assembly to the platform.

The assembly of the camera to the mounting structure will now be explained in relation to FIG. 9. As already understood from the other FIGS, the camera housing is generally rectangular and comprises at a first end 9 the fixing components 8, 8' and at the opposite end 22 the fixing legs 66, 66', all of which are integral with the metallic housing 7. FIG. 9a) is a perspective view of the camera, seen from the front side 7a of the camera housing 7. Reference sign 7c designates the camera lens, which is situated in a stepped portion in the front side 7a. Assembling the camera to the platform 12 starts by positioning the legs 66, 66' in the leg holders 24, 24', as shown in FIG. 9b). From this position, the camera 4 is rotated about the legs 66, 66' towards the platform 12 (as indicated by the arrow 67), in such a way as to present the fixing components 8, 8' at the inlet passage 32 of the spring clips of the respective retention systems 18, 18' : this intermediate position is represented by the dashed circle 90 in FIG. 7. By further pressing the camera housing 7 towards the platform 12, the fixing components 8, 8' are forced into the inlet passage 32 of the spring clips, until both fixing components 8, 8' come into abutment with the reception walls 302, 302' in the configuration of FIG. 2. Hence, during assembly of the camera 4, the spring clip 26, initially in the rest position of FIG. 7, is subject to deformation during the insertion of the fixing component 8, 8', taking a plurality of bending configurations, to arrive at the working position shown in FIG. 2, in which the components 8, 8' are stably locked in place.

If desired, the camera 4 may be removed from the retention systems 18 and 18' by first removing the fixing components from the spring clips 26, 26' (by pressing in the direction of arrows 63, as explained above). The camera housing 7 is then pivoted about the legs 66, 66' in the direction opposite arrow 67 in FIG. 9c), and may finally be removed from the leg holders.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art. In particular, the holding member and/or the spring clip may have alternative designs.

Figure 8:
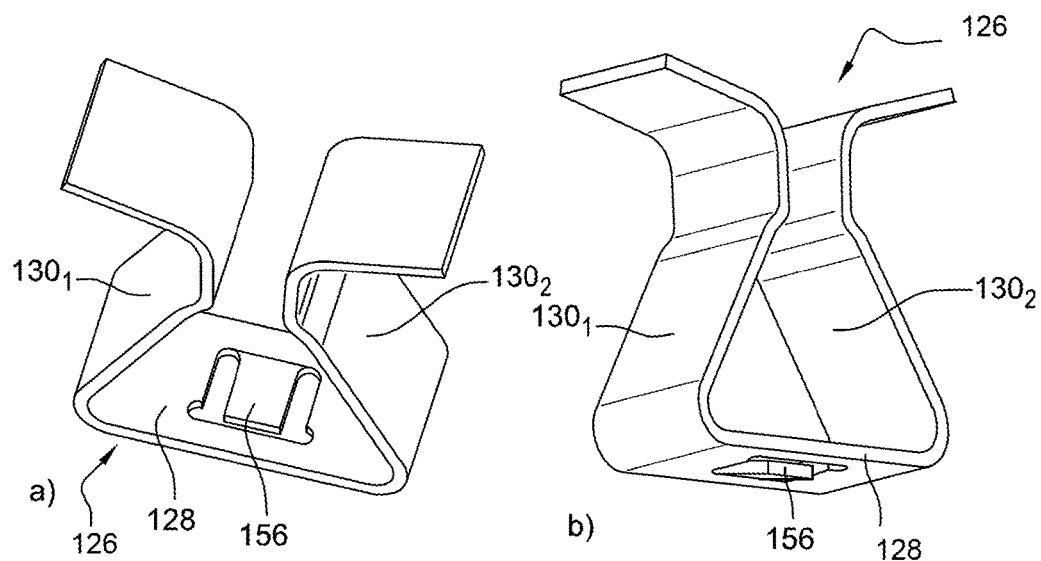
FIG. 8 comprises three perspective principle views of an alternate design: a)-b) spring clip alone; c) view of the lateral sub-members and of the modified second sub-platform.

FIG. 8 for example shows a principle design of an alternative spring clip 126, where the punched protrusion in the base 128 is replaced by a snap element. The base portion 128 is cut to form a downwardly protruding elastic tongue 156. As can be seen in the sketch of FIG. 8c), the lateral sub-member 140, 140' of the holding member 134 and the second sub-platform 150 are configured similarly to FIG. 6, except for the locking cavity 54 and guide groove 57. Here the upper reception wall 1501 has a rectangular cavity 154 matching the width of snap tongue 156. The front portion of the second reception platform comprises a slope 180 that allows guiding the spring clip during assembly and forms an abutment wall 182 for the tongue 156 inside the camera.

While this invention has been described in terms of the preferred embodiments thereof, it is not intended to be so limited, but rather only to the extent set forth in the claims that follow.

We claim:

1. A retention system on a mounting structure for a generally cylindrical component, the retention system comprising:
   a U-shaped spring clip that includes a base and a pair of resilient retainer arms extending from the base along a main axis and defining an inlet passage; and
   a holding member for holding said U-shaped spring clip, wherein said retainer arms are adapted to engage with a first side of the component facing the inlet passage, and said holding member includes a rigid retention wall extending inside the spring clip and which are adapted to engage with a second side of the component opposite the first side, said second side located at a distance from the spring clip base in working position.

2. The retention system according to claim 1, characterized in that said holding member comprises two lateral sub-members that are disjoined, each of said lateral sub members comprising at least one retention wall engaging a respective lateral peripheral portion of said component.

3. The retention system according to claim 2, characterized in that each lateral sub-member comprises at least one support wall, which is configured to be in contact with the end portion of the inner face of the spring clip base in working position.

4. The retention system according to claim 2, characterized in that each of the retainer arms is generally inwardly inclined and connected to the base via an elbow, and each of said lateral sub-members comprises a side face presenting a clearance with the corresponding elbow, in working position.

5. The retention system according to claim 4, characterized in that the spring clip base is received between said support walls and a reception sub-platform.

6. The retention system according to claim 5, characterized in that it comprises a rear support, the holding member and the reception sub-platform protruding from said rear support.

7. The retention system according to claim 6, characterized in that said reception sub-platform is a second reception sub-platform, which receives a central portion of the outer side of said base, the retention system comprising a first reception sub-platform at distance from said second reception sub-platform, the system being configured to receive the outer face of the base on said first reception sub-platform, and allow sliding the base on the second reception sub-platform, for mounting the spring clip.

8. The retention system according to claim 7, characterized in that said reception sub-platform extends beyond said holding member to serve as guide during mounting of said spring clip.

9. The retention system according to claim 5, characterized in that said reception sub-platform comprises a cavity configured to receive a corresponding locking protrusion provided in the spring clip base.

10. The retention system according to claim 1, characterized in that each of the retainer arms engages said first side of the component over a peripheral portion, which has an angular extension ($\alpha$) that is less than 45°.

11. The retention system according to claim 1, characterized in that each of the retainer arms engages said first side of the component over a peripheral portion, which has an angular extension ($\alpha$) that is between 1° and 5°.

12. The retention system according to claim 1, characterized in that the rigid retention wall is positioned inside the spring clip at an average distance from the clip base corresponding to at least 25% of the height of the spring clip, preferably between 30% and 40% of said height.

13. A camera assembly for mounting to a windscreen in a passenger compartment of an automotive vehicle, said camera assembly comprising:
- a camera the includes a cylindrical component;
- a mounting structure comprising a reception platform with a first side adapted to be fixed to the windscreen, and an opposite side adapted for receiving the camera;
- wherein said cylindrical component is fixed by a retention system that includes
- a U-shaped spring clip that includes a base and a pair of resilient retainer arms extending from the base along a main axis and defining an inlet passage; and
- a holding member for holding said U-shaped spring clip,
- wherein said retainer arms are adapted to engage with a first side of the component facing the inlet passage, and said holding member includes a rigid retention wall extending inside the spring clip and which are adapted to engage with a second side of the component opposite the first side, said second side located at a distance from the spring clip base in working position.

14. The camera assembly according to claim 13, characterized in that the camera further comprises two legs at an opposite end of the camera housing, the mounting structure further comprising two leg holders adapted for holding a respective leg.

15. The camera assembly according to claim 14, characterized in that each leg holder comprises a rigid hook, which is adapted to retain a corresponding leg; and in that the rigid hook comprises a fool-proof mounting rib running on the external side of the rigid hook and extending by a noticeable amount over the top portion of the rigid hook.

* * * * *